United States Patent
Park

(10) Patent No.: US 9,969,387 B2
(45) Date of Patent: May 15, 2018

(54) CONTROL SYSTEM

(71) Applicant: Renesas Electronics Corporation, Koutou-ku, Tokyo (JP)

(72) Inventor: Kwangsoo Park, Tokyo (JP)

(73) Assignee: Renesas Electronics Corporation, Tokyo ( * ) Notice: Subject to any disclaimer, the term of this patent is extended or adjusted under 35 U.S.C. 154(b) by 0 days. days.

(21) Appl. No.: 15/196,005

(22) Filed: Jun. 28, 2016

(65) Prior Publication Data

US 2017/0057435 A1    Mar. 2, 2017

(30) Foreign Application Priority Data

Aug. 27, 2015   (JP) .................................. 2015-167719

(51) Int. Cl.
 *B60W 30/00*   (2006.01)
 *B60W 30/08*   (2012.01)
 (Continued)

(52) U.S. Cl.
 CPC ............ *B60W 30/08* (2013.01); *B60W 30/16* (2013.01); *B60W 50/06* (2013.01);
 (Continued)

(58) Field of Classification Search
 CPC ...... B60W 30/00; B60W 30/08; B60W 30/16; B60W 50/00; B60W 50/06; G01S 17/00
 See application file for complete search history.

(56) References Cited

U.S. PATENT DOCUMENTS 6,690,017 B2 * 2/2004 Remillard ............... G01S 19/14
                                                                250/341.8
7,085,637 B2 * 8/2006 Breed .................. B60N 2/2863
                                                                340/440
(Continued)

FOREIGN PATENT DOCUMENTS

EP   1 881 450 A1   1/2008
JP   2008-149805 A   7/2008
(Continued)

OTHER PUBLICATIONS

Extended European Search Report dated Dec. 7, 2016, in European Patent Application No. 16183521.0.

*Primary Examiner* — Yonel Beaulieu
(74) *Attorney, Agent, or Firm* — Shapiro, Gabor and Rosenberger, PLLC

(57) ABSTRACT

A control system includes an information obtaining apparatus, a network, and a control apparatus. The information obtaining apparatus includes a distance information obtaining unit configured to obtain a distance information indicating a distance to an object and a transmission unit configured to transmit the distance information obtained by the distance information obtaining unit. The control apparatus includes a reception unit configured to receive the distance information transmitted by the transmission unit via the network, a distance information correction unit configured to correct the distance information received by the reception unit, and a control unit configured to perform control using the distance information corrected by the distance information correction unit. The distance information correction unit corrects the distance information based on a time taken from when the distance information is obtained by the distance information obtaining unit until the distance information is input to the distance information correction unit.

13 Claims, 13 Drawing Sheets

(51) Int. Cl.
  *B60W 30/16*   (2012.01)
  *B60W 50/00*   (2006.01)
  *B60W 50/06*   (2006.01)
  *G08G 1/16*    (2006.01)

(52) U.S. Cl.
  CPC .  *B60W 2050/0077* (2013.01); *B60W 2420/42* (2013.01); *B60W 2550/302* (2013.01); *B60W 2550/306* (2013.01); *B60W 2550/308* (2013.01); *G08G 1/165* (2013.01); *G08G 1/166* (2013.01)

(56) References Cited

U.S. PATENT DOCUMENTS

| | | | |
|---|---|---|---|
| 7,202,776 B2 * | 4/2007 | Breed | B60N 2/2863 340/435 |
| 8,155,883 B2 | 4/2012 | Yasuhara et al. | |
| 9,043,108 B2 | 5/2015 | Sekiguchi | |
| 2005/0073433 A1 | 4/2005 | Gunderson et al. | |
| 2005/0134440 A1 * | 6/2005 | Breed | B60N 2/2863 340/435 |
| 2008/0040004 A1 * | 2/2008 | Breed | B60R 21/0134 701/45 |
| 2008/0046150 A1 * | 2/2008 | Breed | B60R 21/0134 701/45 |

FOREIGN PATENT DOCUMENTS

| | | |
|---|---|---|
| JP | 2009-085761 A | 4/2009 |
| JP | 2013-203336 A | 10/2013 |
| JP | 2015-024713 A | 2/2015 |

\* cited by examiner

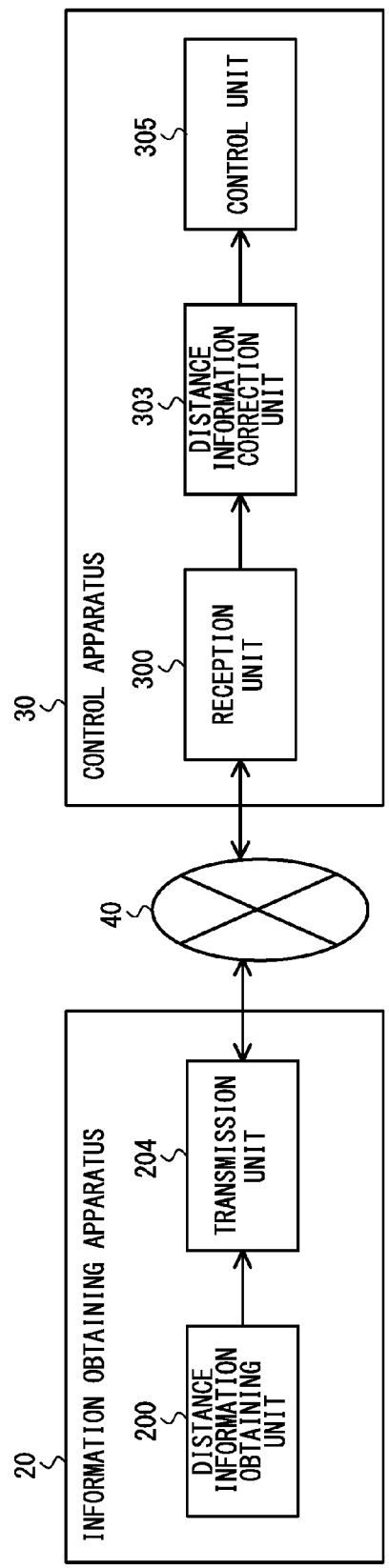

CONTROL SYSTEM

CROSS-REFERENCE TO RELATED APPLICATIONS

This application is based upon and claims the benefit of priority from Japanese patent application No. 2015-167719, filed on Aug. 27, 2015, the disclosure of which is incorporated herein in its entirety by reference.

BACKGROUND

The present invention relates to a control system, and to, for example, a control system that uses distance information indicating a distance to an object.

As disclosed in, for example, Japanese Unexamined Patent Application Publication Nos. 2015-24713 and 2013-203336, a technique for controlling vehicles using information obtained from in-vehicle cameras has been extensively developed recently. When a distance image obtained from an in-vehicle camera is transmitted to a control apparatus, and the control apparatus performs control according to such information, the control apparatus controls a vehicle according to position information that is dislodged from an actual position of the vehicle due to, for example, a transmission delay. In order to address such a problem caused by a transmission delay, for example, Japanese Unexamined Patent Application Publication Nos. 2009-85761 and 2008-149805 disclose a technique for calculating a delay time caused by a transmission delay based on a transmission time and a reception time and corrects position information or distance information.

SUMMARY

However, causes for delays to occur are not always a transmission delay, and there can be other causes for delays to occur. Even when a delay other than a transmission delay occurs, techniques for eliminating an influence of the delay have been desired.

Other problems of the related art and new features of the present invention will become apparent from the following descriptions of the specification and attached drawings.

According to an aspect, a control system corrects distance information based on a time taken from when distance information is obtained by a distance information obtaining unit of an information obtaining apparatus until when the distance information is input to a distance information correction unit of a control apparatus.

According to the above aspect, it is possible to improve an accuracy of control that uses distance information indicating a distance to an object.

BRIEF DESCRIPTION OF THE DRAWINGS

The above and other aspects, advantages and features will be more apparent from the following description of certain embodiments taken in conjunction with the accompanying drawings, in which:

FIG. 13 is a block diagram showing a configuration of a control system according to a modified example of the embodiments.

DETAILED DESCRIPTION

Figure 1:
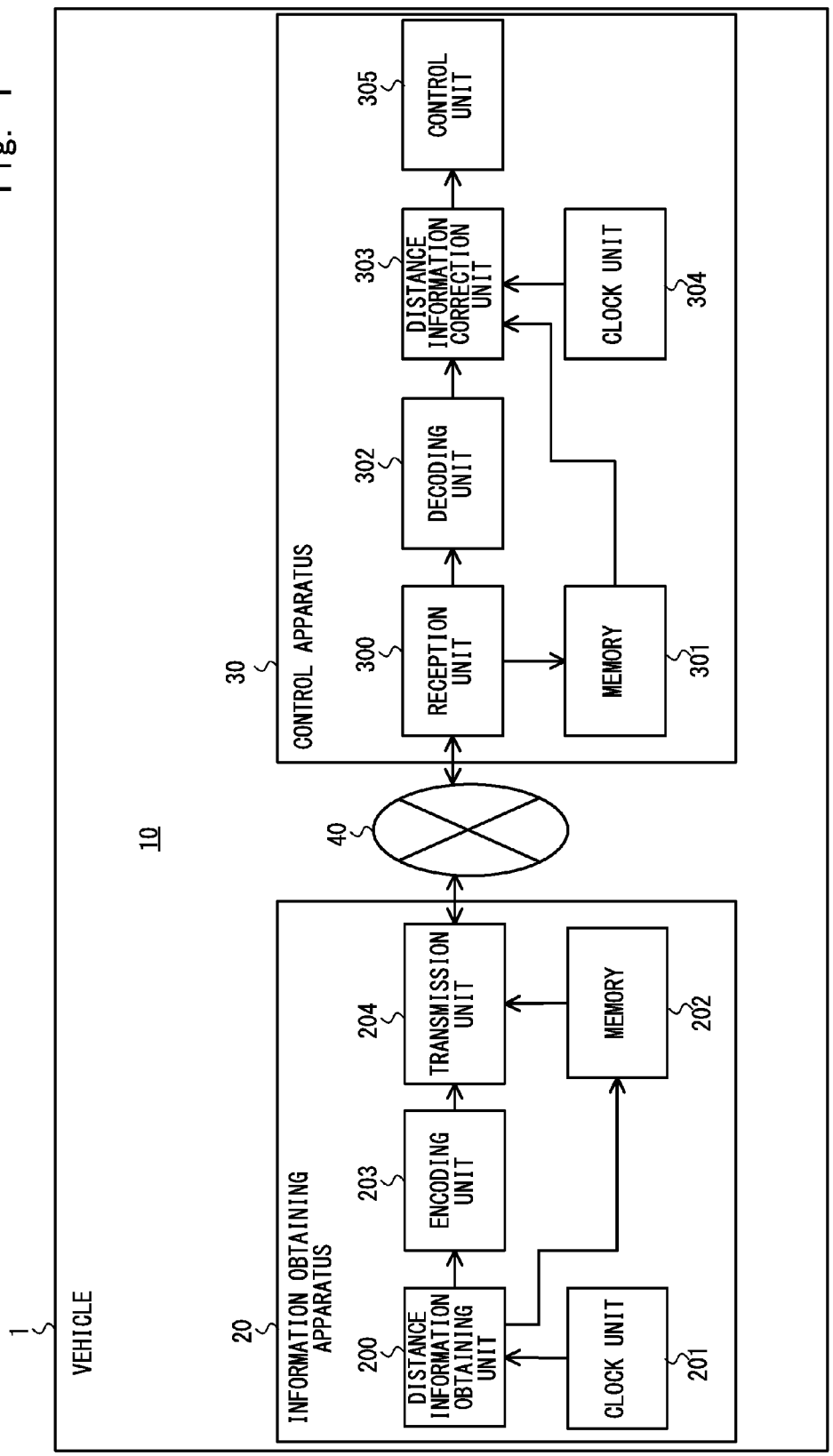
FIG. 1 is a block diagram showing a configuration of a control system according to a first embodiment.

The following descriptions and drawings are omitted and simplified as appropriate to clarify the descriptions. Further, the elements illustrated in the drawings as functional blocks for performing various processes can be implemented hardware-wise by a CPU, a memory, and other circuits, and software-wise by a program loaded onto a memory or the like. Accordingly, it is to be understood by those skilled in the art that these functional blocks can be implemented in various forms including, but not limited to, being implemented by hardware alone, software alone, or a combination of hardware and software. In the drawings, the same elements are denoted by the same reference signs, and repeated descriptions are omitted as necessary.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

First Embodiment

Hereinafter, a first embodiment will be described with reference to the drawings. FIG. 1 is a block diagram showing a configuration of a control system 10 according to a first embodiment. The control system 10 is mounted on, for example, a vehicle 1 as shown in FIG. 1. Hereinafter, although the control system 10 will be described as a system mounted on the vehicle 1, the control system 10 may be mounted on an object other than a vehicle as a system that controls an object to be controlled other than vehicles.

As shown in FIG. 1, the control system 10 includes an information obtaining apparatus 20 and a control apparatus 30. The information obtaining apparatus 20 is connected to the control apparatus 30 via a network 40. The network 40 is compliant with, for example, Ethernet. According to Ethernet, it is easy to create a network and easy to increase the number of transmission and reception apparatuses. Further, according to Ethernet, the number of apparatuses connected to a network can be easily changed. An example of networks compliant with Ethernet is an Ethernet AVB (Audio Video Bridging) network. Note that the network 40 is not limited to this and may be other networks. For example, the network 40 may be an Ethernet network compliant with other standards, CAN (Controller Area Network), or the like. Note that communication between the information obtaining apparatus 20 and the control apparatus 30 is not limited to wired communication and may be wireless communication such as wireless LAN or Bluetooth.

Firstly, the information obtaining apparatus 20 will be described.

The information obtaining apparatus 20 obtains information on an object. Although the information obtaining apparatus 20 is configured as, for example, a stereo camera, a TOF (Time Of Flight) camera, a laser radar, or the like, the information obtaining apparatus 20 may be configured as another apparatus that obtains information of a distance to the object. The information obtaining apparatus 20 includes a distance information obtaining unit 200, a clock unit 201, a memory 202, an encoding unit 203, and a transmission unit 204.

The distance information obtaining unit 200 obtains distance information. The distance information indicates a distance to the object. For example, the distance information obtaining unit 200 obtains the distance information using a measurement technique such as a stereo camera, a TOF camera, a laser radar, or the like. When the distance information obtaining unit 200 obtains the distance information, the distance information obtaining unit 200 obtains an obtained time, which is a time when the distance information is obtained, from the clock unit 201. The distance information obtaining unit 200 outputs the distance information, which has been obtained, to the encoding unit 203 and stores the obtained time, which has been obtained, in the memory 202.

The memory 202 is a storage unit that is comprised of an SRAM (Static Random Access Memory), a DDR (Double Data Rate) memory, or the like.

The clock unit 201 outputs a time. The clock unit 201 is synchronized with a clock unit 304 of the control apparatus 30, which will be described later. In this embodiment, although the clock unit 201 is synchronized with the clock unit 304 according to IEEE 1588 PTP (Precision Time Protocol), the clock unit 201 may be synchronized with the clock unit 304 according to other protocols.

The encoding unit 203 encodes the distance information obtained by the distance information obtaining unit 200 according to a predetermined encoding scheme. The encoding unit 203 performs an encoding process on a distance image obtained by the distance information obtaining unit 200 using, for example, a codec such as JPEG or H.264. The encoding unit 203 outputs the encoded distance information to the transmission unit 204.

The transmission unit 204 transmits the distance information obtained by the distance information obtaining unit 200. To be more specific, the transmission unit 204 transmits the distance information encoded by the encoding unit 203 to the control apparatus 30 via the network 40. When the encoded distance information is input to the transmission unit 204 from the encoding unit 203, the transmission unit 204 reads out the obtained time for the distance information from the memory 202 and transmits the encoded distance information and the obtained time to the control apparatus 30.

Next, the control apparatus 30 will be described.

The control apparatus 30 performs processing that uses information obtained by the information obtaining apparatus 20 and, in this embodiment, is an ECU (Electronic Control Unit) that controls the vehicle 1 using the distance information obtained by the information obtaining apparatus 20. As will be described later, the control apparatus 30 corrects the distance information obtained by the distance information obtaining unit 200 and controls the vehicle 1 using the corrected distance information. As shown in FIG. 1, the control apparatus 30 includes a reception unit 300, a memory 301, a decoding unit 302, a distance information correction unit 303, a clock unit 304, and a control unit 305.

The reception unit 300 receives information transmitted from the transmission unit 204 of the information obtaining apparatus 20. To be more specific, the reception unit 300 receives the encoded distance information and the obtained time that have been transmitted by the transmission unit 204. The reception unit 300 outputs the encoded distance information, which has been received, to the decoding unit 302. Further, the reception unit 300 stores the received obtained time in the memory 301. As with the memory 202, the memory 301 is a storage unit that is comprised of, for example, an SRAM, a DDR memory, or the like.

The decoding unit 302 decodes the encoded distance information that has been input. For example, the decoding unit 302 performs a decoding process on a distance image using a codec such as JPEG or H.264. The decoding unit 302 outputs the decoded distance information to the distance information correction unit 303.

The distance information correction unit 303 corrects the distance information received by the reception unit 300. To be more specific, the distance information correction unit 303 corrects the distance information decoded by the decoding unit 302. The distance information correction unit 303 corrects the distance information based on a time taken from when the distance information is obtained by the distance information obtaining unit 200 of the information obtaining apparatus 20 until the distance information is input to the distance information correction unit 303.

Hereinafter, the correction of the distance information performed by the distance information correction unit 303 will be described in detail.

The distance information correction unit 303 obtains, from the clock unit 304, a time when the distance information is input from the decoding unit 302. That is, the distance information correction unit 303 obtains, from the clock unit 304, an input time when the distance information is input to the distance information correction unit 303. Note that the clock unit 304 is synchronized with the clock unit 201 and outputs a time. Further, when the distance information is input to the distance information correction unit 303, the distance information correction unit 303 reads out the obtained time for the distance information from the memory 301.

Next, the distance information correction unit 303 calculates a delay time based on the input time and the obtained time. More specifically, the distance information correction unit 303 calculates the delay time by the following expression (1).

$$(\text{Delay time}) = (\text{input time}) - (\text{obtained time}) \tag{1}$$

The above delay time includes not only a delay time caused by a transmission delay in the network 40 but also other delay times caused by a processing time and the like performed by the encoding unit 203 and the decoding unit 302.

The distance information correction unit 303 corrects the distance information using a relative speed with respect to the object and the delay time calculated by the above expression (1). Note that the relative speed is a relative speed of the vehicle 1 with respect to the object described in the distance information to be corrected. The distance information correction unit 303 obtains the relative speed that has been measured by, for example, a measurement unit (not shown) and corrects the distance information.

The object to be measured by the distance information obtaining unit 200 may be, for example, a stationary object such as a wall of a car park or a moving object such as a preceding vehicle travelling in front of the vehicle 1. For example, when the object is a stationary object, the relative speed with respect to the object is equal to the speed of the vehicle 1 and can be easily obtained. That is, when the object is a stationary object, the distance information correction unit 303 can use the speed of the control apparatus 30 (the vehicle 1) as the relative speed.

Whereas when the object is a moving object, the relative speed can be obtained from a change in the distance information obtained by the distance information obtaining unit 200. That is, when the object is a moving object, the distance information correction unit 303 can use a speed calculated from a change in the distance information obtained by the distance information obtaining unit 200 as the relative speed. To be more specific, for example, when the distance information obtained at a predetermined time that is before the obtained time for the distance information to be corrected is used, the relative speed can be calculated by an amount of change in the distance information in the predetermined time. Note that a method for obtaining the relative speed is not limited to the above method and may be other methods.

The distance information correction unit 303 uses the delay time and the relative speed to correct the distance information by the following expression (2).

(Corrected distance)=(distance before correction)−
(relative speed)×(delay time)     (2)

The distance information correction unit 303 outputs the corrected distance information to the control unit 305.

The control unit 305 controls the vehicle 1 using the distance information corrected by the distance information correction unit 303. For example, when an object is present in front of the vehicle 1, the control unit 305 performs control such as brake control, warning a driver of the vehicle 1, a collision avoidance movement, and the like in order to avoid a collision with the object.

Figure 2:
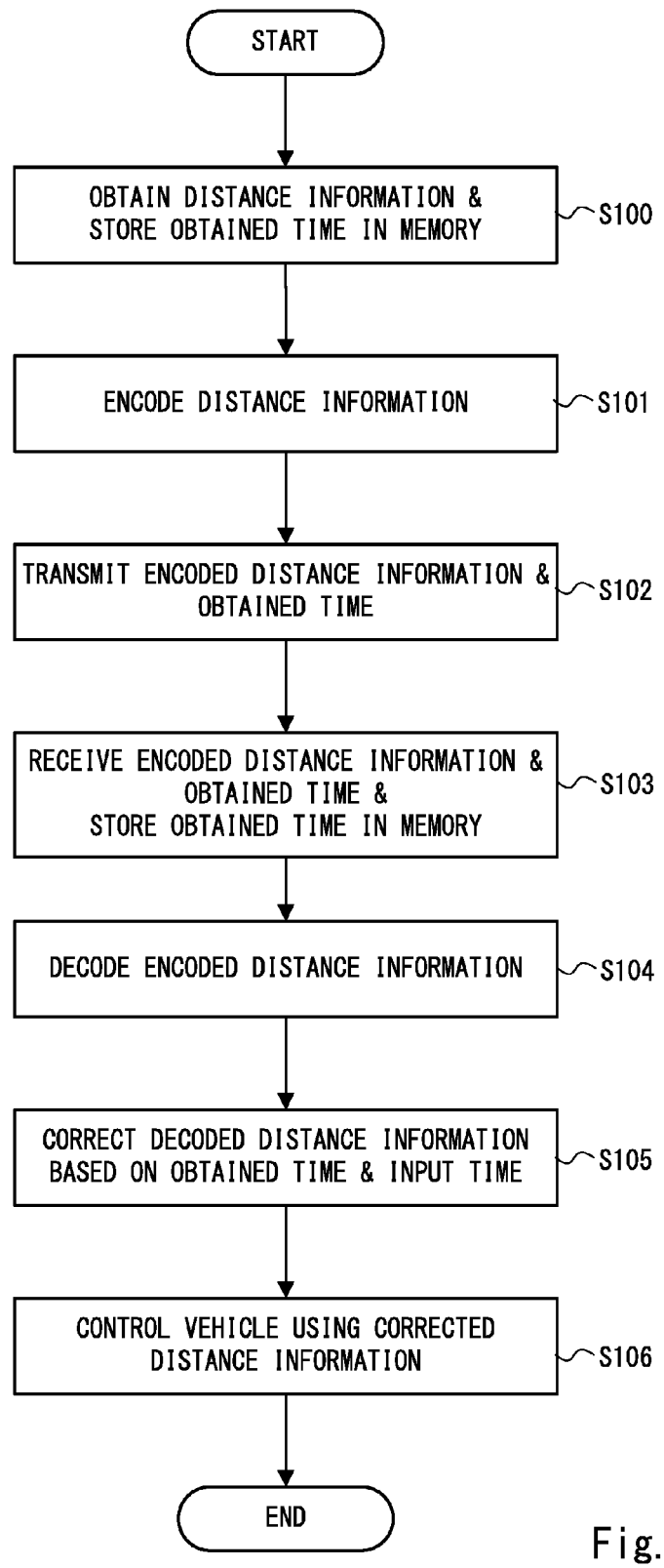
FIG. 2 is a flowchart showing an example of an operation of a control system according to the first embodiment.

Next, an example of an operation of the control system 10 according to the first embodiment will be described. FIG. 2 is a flowchart showing an example of an operation of the control system 10 according to the first embodiment. Hereinafter, the example of the operation will be described with reference to FIG. 2.

In the step 100 (S100), the distance information obtaining unit 200 of the information obtaining apparatus 20 obtains distance information indicating a distance to an object, outputs the obtained distance information to the encoding unit 203 and also obtains an obtained time for the distance information from the clock unit 201 and stores it in the memory 202.

In the step 101 (S101), the encoding unit 203 encodes the input distance information according a predetermined encoding scheme and outputs the encoded distance information to the transmission unit 204.

In the step 102 (S102), the transmission unit 204 transmits the distance information encoded in the step 101 to the control apparatus 30 via the network 40. At this time, the transmission unit 204 reads out, from the memory 202, an obtained time for the distance information to be transmitted and transmits the obtained time together with the distance information.

In the step 103 (S103), the reception unit 300 of the control apparatus 30 receives the encoded distance information and the obtained time that have been transmitted by the transmission unit 204 in the step 102. At this time, the reception unit 300 stores the received obtained time in the memory 301 and also outputs the received distance information to the decoding unit 302.

In the step 104 (S104), the decoding unit 302 decodes the encoded distance information. The decoding unit 302 outputs the decoded distance information to the distance information correction unit 303.

In the step 105 (S105), the distance information correction unit 303 corrects the distance information decoded in the step 104 based on the obtained time for the distance information and an input time that is a time when the distance information is input to the distance information correction unit 303. To be more specific, when the distance information is input from the decoding unit 302, the distance information correction unit 303 obtains the input time from the clock unit 304 and also obtains, from the memory 301, the obtained time indicating a time when the distance information is obtained. Then, the distance information correction unit 303 calculates a delay time by the expression (1) using the obtained time and the input time and calculates corrected distance information by the expression (2).

In the step 106 (S106), the control unit 305 controls the vehicle 1 based on the distance information corrected in the step 105.

According to this embodiment, the control system 10 can correct errors caused not only by a transmission delay in the network 40 but also by an arbitrary delay time generated from when distance information is obtained until immediately before the distance information is used. Therefore, according to the control system 10 of this embodiment, it is possible to improve an accuracy of control that uses the distance information indicating a distance to an object.

In the above embodiment, although the encoding unit 203 and the decoding unit 302 are included in the control system 10 as the units that perform processes possibly generating a delay, the control system 10 may further include another processing unit that performs a process possibly generating another delay, in place of or in addition to the encoding unit 203 and the decoding unit 302. That is, the information obtaining apparatus 20 or the control apparatus 30 of the control system 10 may include an arbitrary processing unit that performs a predetermined process on distance information obtained by the distance information obtaining unit 200. With such a configuration, the distance information correction unit 303 may correct the distance information, on which the process has been performed by the processing unit, based on an obtained time indicating a time when the distance information is obtained by the distance information obtaining unit 200 and an input time indicating a time when the distance information, on which the process has been performed by the processing unit, is input to the distance information correction unit 303. That is, the above encoding unit 203 and decoding unit 302 are an example of this processing unit and are processing units that perform an encoding process on the distance information obtained by the distance information obtaining unit 200.

Second Embodiment

Figure 3:
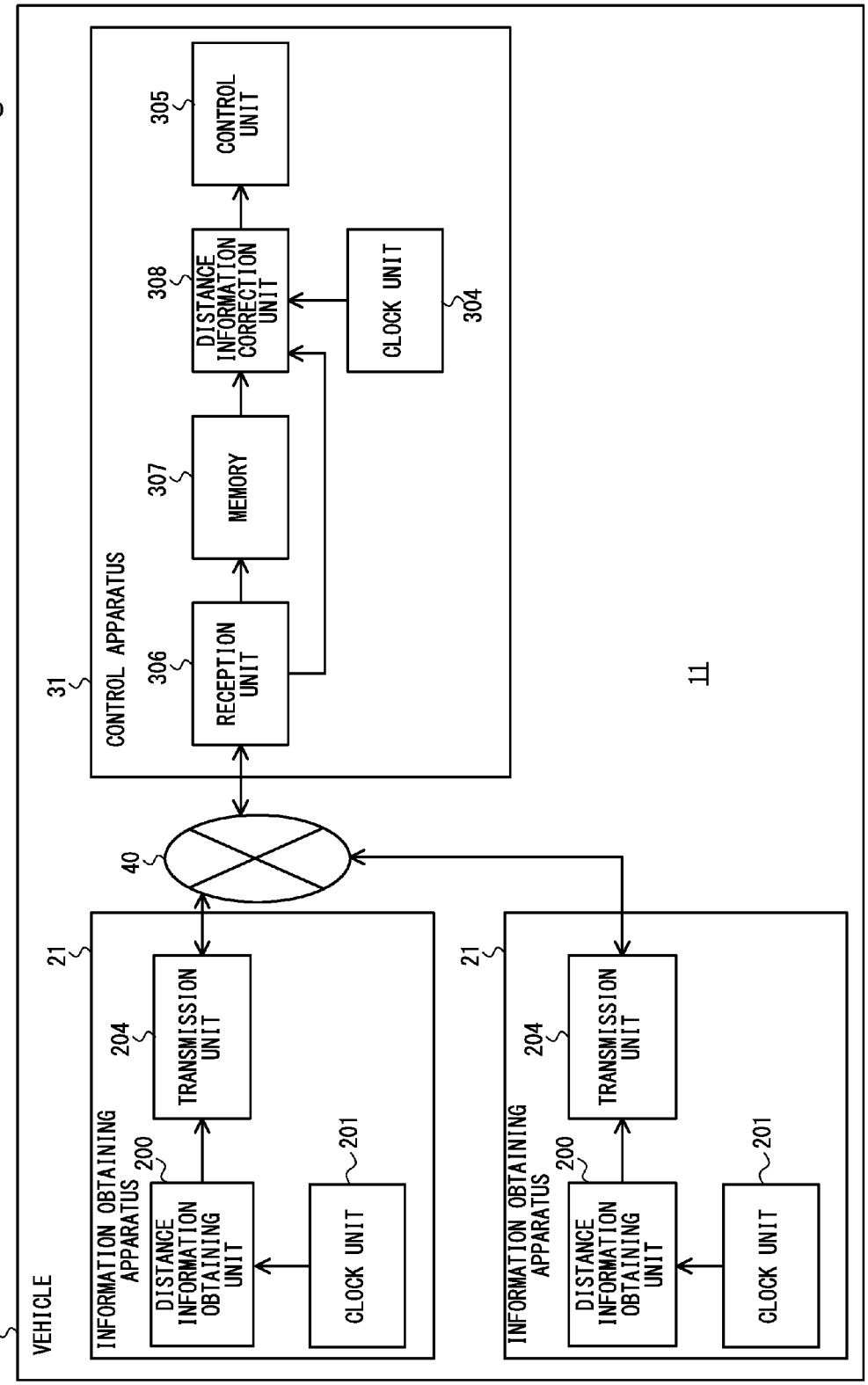
FIG. 3 is a block diagram showing a configuration of a control system according to a second embodiment.

Next, a control system 11 according to a second embodiment will be described. FIG. 3 is a block diagram showing a configuration of the control system 11 according to the second embodiment. A main difference between the first and second embodiments is that, as shown in FIG. 3, in the second embodiment, the control system includes a plurality of information obtaining apparatuses. The control system 11 according to this embodiment includes a plurality of information obtaining apparatuses 21 and a control apparatus 31. To be more specific, in this embodiment, although the control system 11 includes two information obtaining apparatuses 21, the number of the information obtaining apparatuses 21 is not limited to two and may be greater than two. The respective information obtaining apparatuses 21 are connected to the control apparatus 31 via the network 40.

Each of the information obtaining apparatus 21 includes the distance information obtaining unit 200, the clock unit 201, and the transmission unit 204. As the distance information obtaining units 200, the clock units 201, and the transmission units 204 according to this embodiment are the same as the distance information obtaining unit 200, the clock unit 201, and the transmission unit 204 of the information obtaining apparatus 20 according to the first embodiment, descriptions thereof will be omitted. Unlike the information obtaining apparatus 20 according to the first embodiment, each of the information obtaining apparatuses 21 does not include the encoding unit 203 and the memory 202. However, the information obtaining apparatuses 21 each may include the encoding unit 203 and the memory 202 so that it will have the same configuration as that of the information obtaining unit 20.

In each of the information obtaining apparatuses 21, the transmission unit 204 transmits distance information obtained by the distance information obtaining unit 200 to the control apparatus 31 via the network 40 together with an obtained time for the distance information that is obtained from the clock unit 201.

The control apparatus 31 includes the reception unit 306, the memory 307, the clock unit 304, the distance information correction unit 308, and the control unit 305. Unlike the control apparatus 30 according to the first embodiment, the control apparatus 31 does not include the decoding unit 302. However, the control apparatus 31 may include the decoding unit 302 so that it will have the same configuration as that of the control apparatus 30.

The reception unit 306 stores the received distance information and obtained time in the memory 307. As with the memory 202, the memory 307 is a storage unit that is comprised of, for example, an SRAM, a DDR memory, or the like. That is, the memory 307 is a storage unit that stores the distance information obtained by the distance information obtaining unit 200 and the obtained time indicating a time when the distance information is obtained. When the reception unit 306 receives the distance information from all of the information obtaining apparatuses 21, the reception unit 306 notifies the distance information correction unit 308 to that effect.

The distance information correction unit 308 corrects each piece of the distance information based on the obtained time stored in the memory 307 and the input time indicating a time when the distance information is input to the distance information correction unit 308 from the memory 307. To be more specific, when the distance information correction unit 308 receives, from the reception unit 306, the notification indicating that the distance information is received from all of the information obtaining apparatuses 21, the distance information correction unit 308 reads out, from the memory 307, the distance information and the obtained times transmitted from the respective information obtaining apparatus 21 and also obtains a read-out time from the clock unit 304. Although in this embodiment, the distance information correction unit 308 starts a correction process upon receipt of the notification from the reception unit 306 indicating that the distance information has been obtained from all of the information obtaining apparatuses 21, such a notification is not necessarily needed to start the correction process. For example, the reception unit 306 may notify the distance information correction unit 308 of a receipt of the distance information every time the reception unit 306 receives the distance information from one of the information obtaining apparatuses 21, and the distance information correction unit 308 may use the notifications to detect that the distance information is obtained from all of the information obtaining apparatuses 21 and then start the correction process.

The distance information correction unit 308 calculates delay times for the respective pieces of the distance information transmitted from the respective information obtaining apparatuses 21. To be more specific, the distance information correction unit 308 calculates the delay times of the respective pieces of the distance information by the above expression (1). In this embodiment, the input time is a time when the distance information correction unit 308 reads out the distance information and the obtained time from the memory 307.

Note that if it is guaranteed that the distance information obtaining units 200 obtain the respective pieces of the distance information at the same time in the respective information obtaining apparatuses 21, the obtained times in the respective information obtaining apparatuses 21 will be the same. Accordingly, in such a case, the obtained times from all of the information obtaining apparatuses 21 are not necessarily needed. Thus, in such a case, it is not necessary to calculate a delay time for each piece of the distance information, and one delay time may be calculated based on any one of transmission times and a read-out time.

Next, as in the first embodiment, the distance information correction unit 308 corrects the respective pieces of the distance information by the above expression (2). The distance information correction unit 308 outputs the respective pieces of the corrected distance information to the control unit 305. The control unit 305 controls the vehicle 1 based on the plurality of pieces of the input distance information. For example, the control unit 305 creates a three-dimensional map or a map indicating an entire circumference of the vehicle 1 from the plurality of pieces of the distance information and controls the vehicle 1 according to the map.

Figure 4:
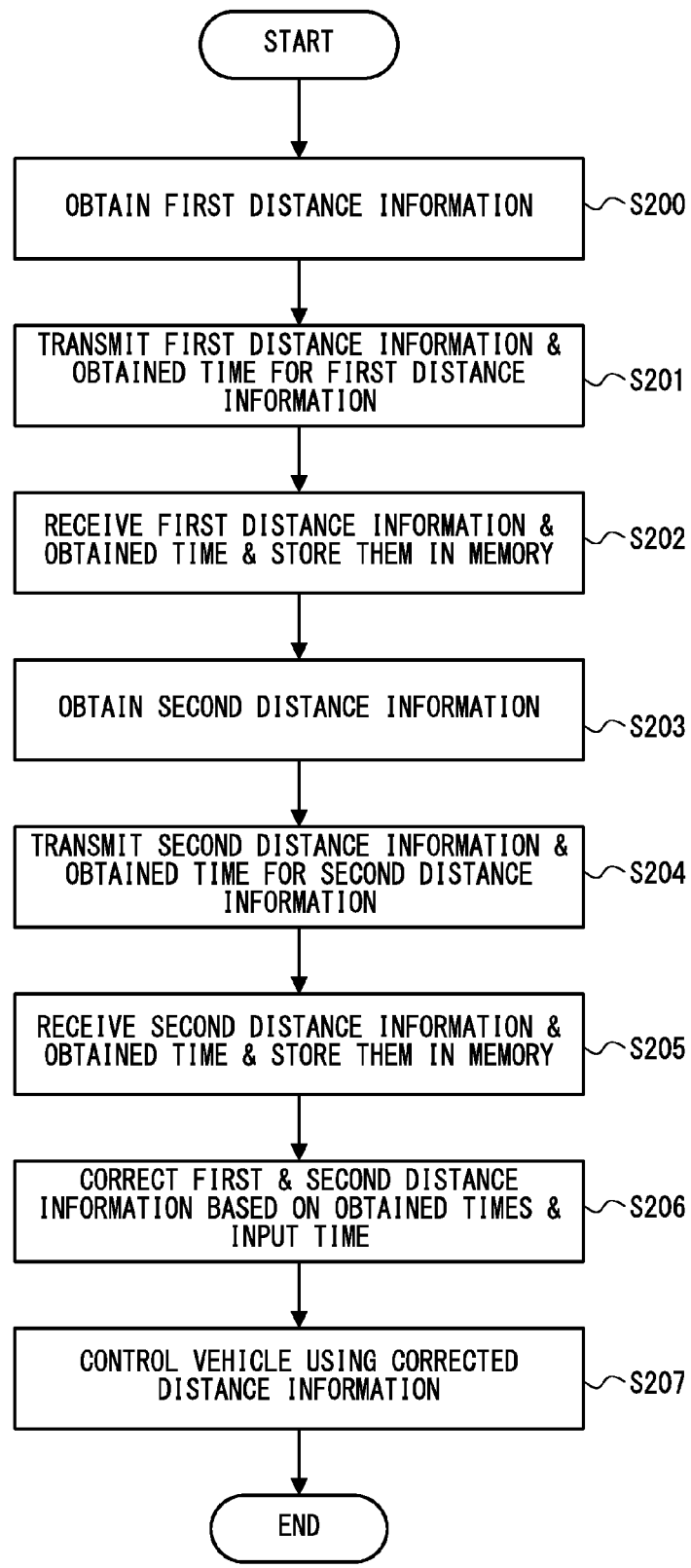
FIG. 4 is a flowchart showing an example of an operation of a control system according to the second embodiment.

Next, an example of an operation of the control system 11 according to the second embodiment will be described. FIG. 4 is a flowchart showing an example of an operation of the control system 11 according to the second embodiment. Hereinafter, the example of the operation will be described with reference to FIG. 4.

In the step 200 (S200), the distance information obtaining unit 200 of a first information obtaining apparatus 21 from among the plurality of information obtaining apparatuses 21 obtains distance information indicating a distance to an object (first distance information) and also obtains an obtained time for the distance information from the clock unit 201. Then, the distance information obtaining unit 200 of the first information obtaining apparatus 21 outputs the obtained distance information and obtained time to the transmission unit 204.

In the step 201 (S201), the transmission unit 204 transmits the distance information and the obtained time to the control apparatus 31 via the network 40.

In the step 202 (S202), the reception unit 306 of the control apparatus 31 receives the first distance information and the obtained time for the first distance information that have been transmitted by the transmission unit 204 in the step 201. At this time, the reception unit 306 stores the received first distance information and obtained time for the first distance information in the memory 307.

In the step 203 (S203), the distance information obtaining unit 200 of a second information obtaining apparatus 21 from among the plurality of information obtaining apparatuses 21 obtains the distance information indicating a distance to the object (second distance information) and also obtains an obtained time for the distance information from the clock unit 201. Then, the distance information obtaining unit 200 of the second information obtaining apparatus 21 outputs the obtained distance information and obtained time to the transmission unit 204.

In the step 204 (S204), the transmission unit 204 transmits the distance information and the obtained time to the control apparatus 31 via the network 40.

In the step 205 (S205), the reception unit 306 of the control apparatus 31 receives the second distance information and the obtained time for the second distance information that have been transmitted by the transmission unit 204 in the step 204. At this time, the reception unit 306 stores the received second distance information and the obtained time for the second distance information in the memory 307.

Note that the processes from the steps 200 to 202 and the processes from the steps 203 to 205 may be performed in parallel.

In the step 206 (S206), when the respective pieces of the distance information are transmitted from all of the information obtaining apparatuses 21, the distance information correction unit 308 corrects the respective pieces of the distance information based on the respective obtained times and the input time. To be more specific, when the respective pieces of the distance information from all of the information obtaining apparatuses 21 are stored in the memory 307, the distance information correction unit 308 reads out the respective pieces of the distance information and the obtained times from the memory 307 and also obtains the input time, which is a read-out time, from the clock unit 304. Then, the distance information correction unit 308 calculates delay times by the expression (1) using the obtained times and the input time and calculates the corrected distance information by the expression (2).

In the step 207 (S207), the control unit 305 controls the vehicle 1 based on the respective pieces of the distance information that have been corrected in the step 206. To be more specific, the control unit 305 controls the vehicle 1 using all pieces of the corrected distance information at the same time.

According to this embodiment, the control system 11 can correct errors caused not only by a transmission delay in the network 40 but also by an arbitrary delay time generated from when distance information is obtained until immediately before the distance information is used. To be more specific, the control system 11 can correct errors caused not only by a transmission delay but also by a delay time that corresponds to an accumulated time taken for respective pieces of distance information from all of the information obtaining apparatus 21 to be accumulated in the memory 307. Therefore, according to the control system 11 of this embodiment, in the control system that uses information obtained by the plurality of information obtaining apparatuses 21, it is possible to improve an accuracy of control that uses the distance information indicating a distance to an object.

Third Embodiment

Figure 5:
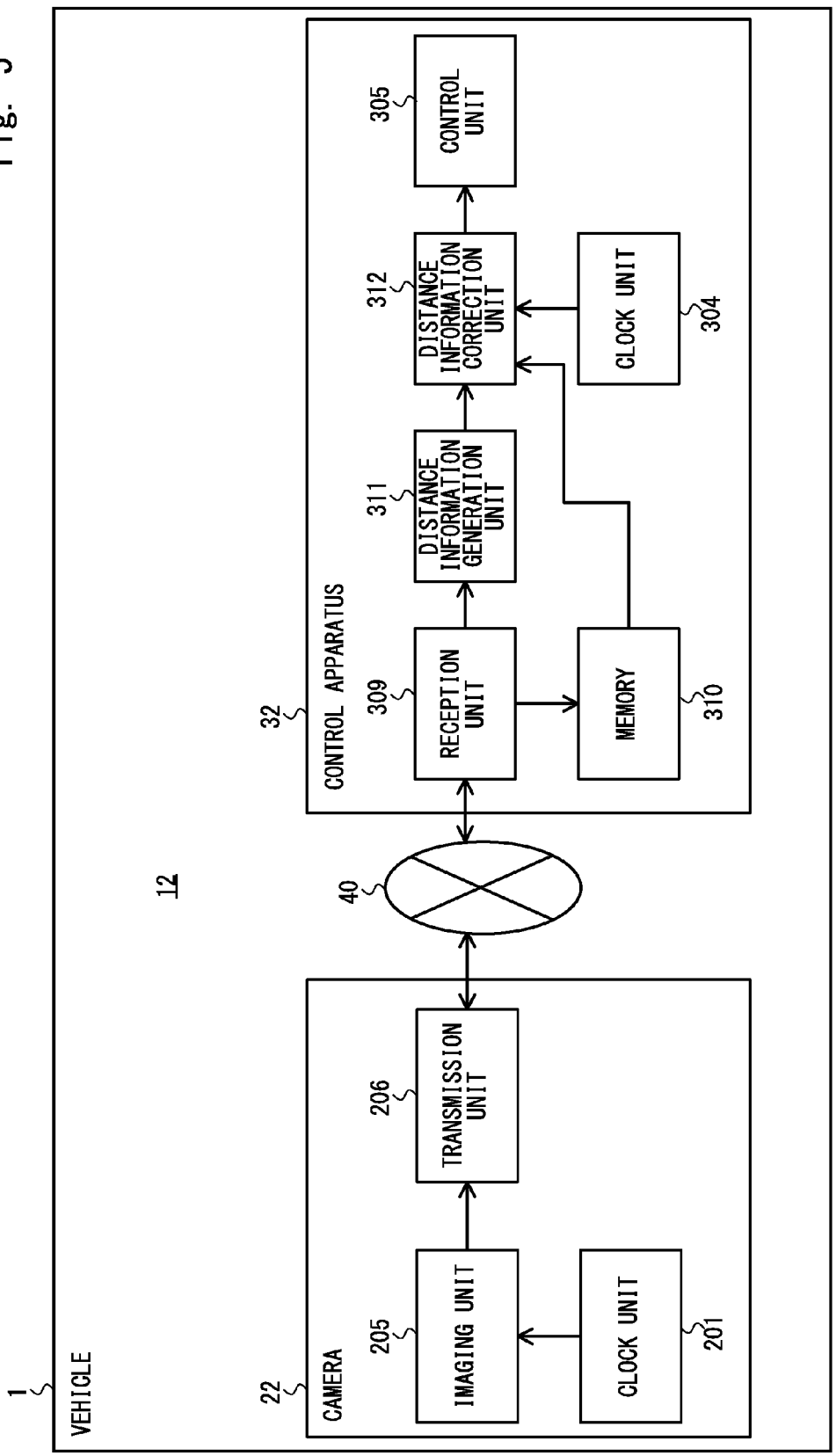
FIG. 5 is a block diagram showing a configuration of a control system according to a third embodiment.

Next, a control system 12 according to a third embodiment will be described. FIG. 5 is a block diagram showing a configuration of the control system 12 according to the third embodiment. Differences between the first and third embodiments are that, as shown in FIG. 5, in the third embodiment, the control system includes a camera 22 in place of the information obtaining apparatus 20, and the control apparatus generates the distance information. In this embodiment, descriptions of components that are same as those already described above will be omitted as appropriate.

The camera 22 is, for example, a stereo camera, and includes an imaging unit 205, a clock unit 201, and a transmission unit 206.

The imaging unit 205 captures an image of an object by an imaging element such as a CCD (Charge Coupled Device) sensor. When the camera 22 is configured as a stereo camera, the imaging unit 205 captures images of the object from a plurality of different directions at the same time.

When the imaging unit 205 captures an image(s), the imaging unit 205 obtains an obtained time (a captured time) when the captured image(s) is obtained from the clock unit 201. The imaging unit 205 outputs the captured image(s) and the obtained time to the transmission unit 206. Note that as in the above embodiments, the clock unit 201 in the camera 22 is synchronized with a clock unit 304 of the control apparatus.

The transmission unit 206 transmits the image(s) captured by the imaging unit 205. More specifically, the transmission unit 206 transmits the captured image(s) and the obtained time to the control apparatus 32 via the network 40.

As with the information obtaining apparatus 20 according to the first embodiment, the camera 22 may include the encoding unit 203 and the memory 202.

The control apparatus 32 includes a reception unit 309, a memory 310, a distance information generation unit 311, a distance information correction unit 312, the clock unit 304, and the control unit 305. Unlike the control apparatus 30 according to the first embodiment, the control apparatus 32 does not include the decoding unit 302. However, the control apparatus 32 may include the decoding unit 302.

The reception unit 309 receives the image(s) transmitted by the transmission unit 206 of the camera 22 via the network 40. To be more specific, the reception unit 309 receives the image(s) transmitted by the transmission unit 206 of the camera 22 together with an obtained time for the image(s). The reception unit 309 outputs the received captured image(s) to the distance information generation unit 311 and outputs the received obtained time to the memory 310. As with the memory 202, the memory 310 is a storage unit that is comprised of, for example, an SRAM, a DDR memory, or the like.

The distance information generation unit 311 generates distance information indicating a distance to an object from the image(s) received by the reception unit 309. The distance information generation unit 311 generates the distance information based on, for example, a plurality of captured images that have been received by the reception unit 309. Note that the distance information generation unit 311 may perform image processing on a single captured image and generate the distance information. The distance information generation unit 311 outputs the generated distance information to the distance information correction unit 312.

The distance information correction unit 312 corrects the distance information that has been generated by the distance information generation unit 311. The distance information correction unit 312 corrects the distance information based on a time taken from when the image is captured by the imaging unit 205 until the distance information is input to the distance information correction unit 312. When the generated distance information is output from the distance information generation unit 311 to the distance information correction unit 312, the distance information correction unit 312 obtains, from the clock unit 304, an input time indicating a time when the distance information is input to the distance information correction unit 312 from the distance information generation unit 311 and also reads out the obtained time stored in the memory 310. Then, the distance information correction unit 312 corrects the distance information based on the obtained time and the input time. More specifically, the distance information correction unit 312 calculates a delay time of the distance information by the above expression (1) and corrects the distance information by the above expression (2). The distance information correction unit 312 outputs the corrected distance information to the control unit 305.

Figure 6:
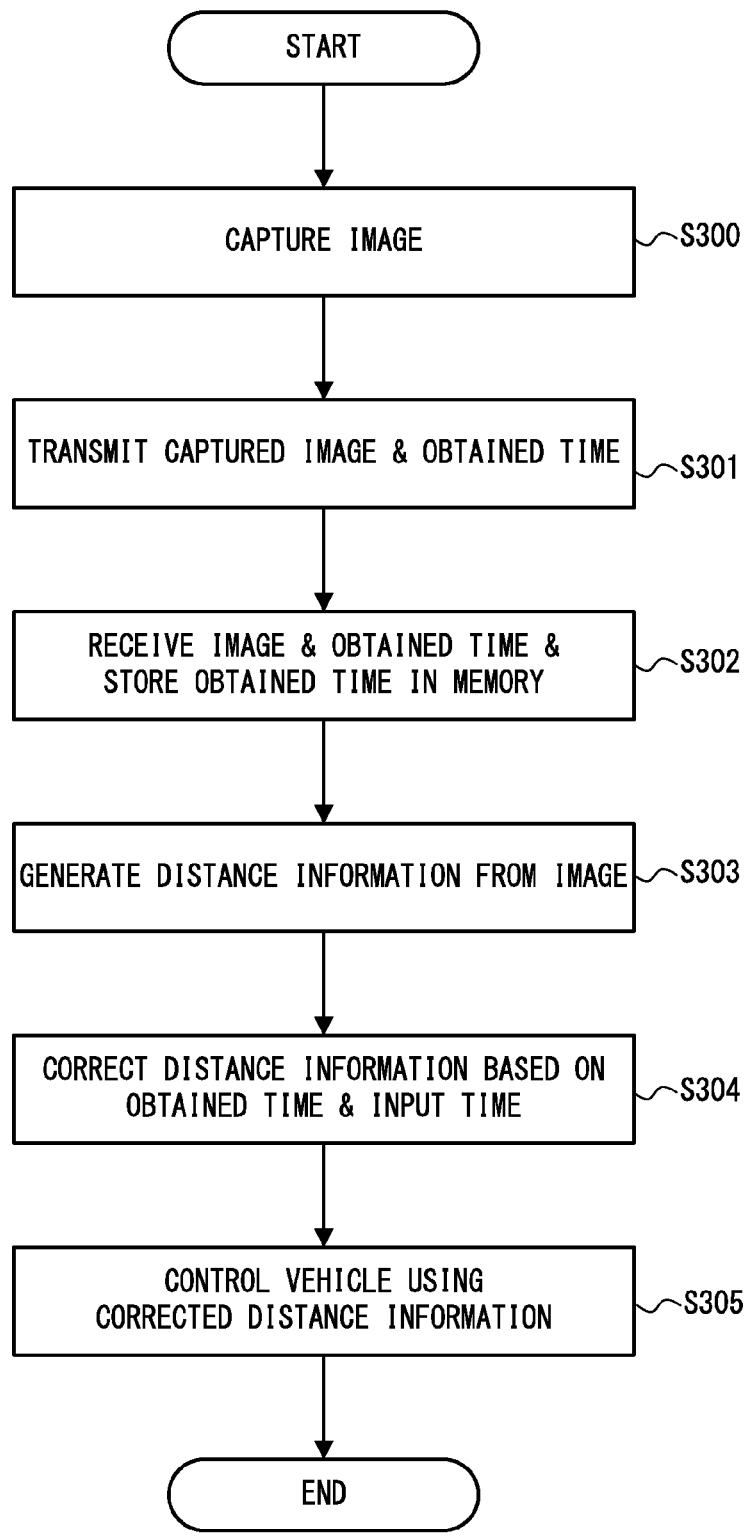
FIG. 6 is a flowchart showing an example of an operation of the control system according to the third embodiment.

Next, an example of an operation of the control system 12 according to the third embodiment will be described. FIG. 6 is a flowchart showing an example of an operation of the control system 12 according to the third embodiment. Hereinafter, the example of the operation will be described with reference to FIG. 6.

In the step 300 (S300), the imaging unit 205 of the camera 22 captures an image(s) of an object and also obtains an obtained time (a captured time) of the captured image(s) from the clock unit 201. Then, the imaging unit 205 outputs the captured image(s) and the obtained time to the transmission unit 206.

In the step 301 (S301), the transmission unit 206 transmits the image(s) together with the obtained time to the control apparatus 32 via the network 40.

In the step 302 (S302), the reception unit 309 of the control apparatus 32 receives the image(s) and the obtained time for the image(s) that have been transmitted by the transmission unit 206 in the step 301. At this time, the reception unit 306 outputs the received image(s) to the distance information generation unit 311 and stores the received obtained time in the memory 310.

In the step 303 (S303), the distance information generation unit 311 generates the distance information from the image(s).

In the step 304 (S304), the distance information correction unit 312 corrects the distance information based on the obtained time and the input time. To be more specific, when the distance information is input from the distance information generation unit 311, the distance information correction unit 312 reads out the obtained time from the memory 310 and also obtains, from the clock unit 304, the input time indicating a time when the distance information is input to the distance information correction unit 312. Then, the distance information correction unit 312 calculates a delay time by the expression (1) using the obtained time and the input time and calculates the corrected distance information by the expression (2).

In the step 305 (S305), the control unit 305 controls the vehicle 1 based on the distance information corrected in the step 304.

According to this embodiment, the control system 12 can correct errors caused not only by a transmission delay in the network 40 but also by an arbitrary delay time generated from when a captured image(s) of an object is obtained until immediately before the distance information is used. To be more specific, the control system 12 can correct errors caused not only by a transmission delay but also by a delay time that corresponds to a processing time required to generate distance information from an image(s). Therefore, according to the control system 12 of this embodiment, it is possible to improve an accuracy of control that uses the distance information indicating a distance to an object.

Note that the configuration of the control system 12 according to this embodiment may be configured in a manner similar to that in the second embodiment. That is, the control system 12 may include a plurality of the cameras 22 and may correct a plurality of pieces of distance information based on a delay time corresponding to a time taken for all pieces of the distance information to be accumulated in the memory. Further, as in the first embodiment, the control system 12 may be configured to include an encoding unit that encodes images and a decoding unit that decodes the images.

Fourth Embodiment

Figure 7:
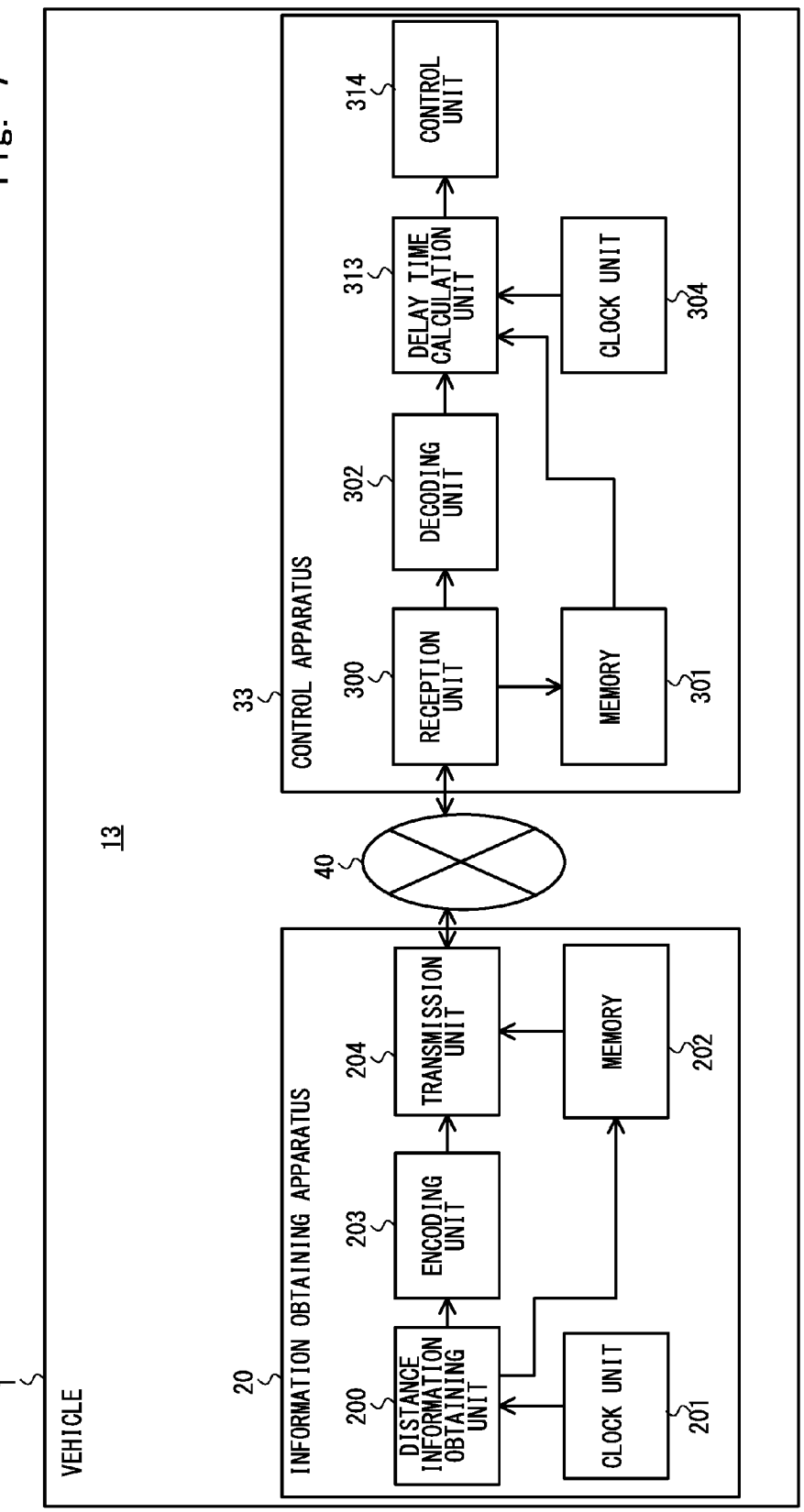
FIG. 7 is a block diagram showing a configuration of a control system according to a fourth embodiment.

Next, a control system 13 according to a fourth embodiment will be described. FIG. 7 is a block diagram showing a configuration of the control system 13 according to the fourth embodiment. A difference between the first and fourth embodiments is that, as shown in FIG. 7, the distance information correction unit 303 in the first embodiment is replaced by a delay time calculation unit 313 in the fourth embodiment. In this embodiment, descriptions of components that are same as those already described above will be omitted as appropriate.

The control system 13 according to this embodiment includes an information obtaining apparatus 20 and a control apparatus 33. The information obtaining apparatus 20 according to this embodiment has the same configuration as that of the information obtaining apparatus 20 according to the first embodiment.

As described above, a difference between the control apparatus 33 according to this embodiment and the control apparatus 30 according to the first embodiment is that the distance information correction unit 303 in the first embodiment is replaced by the delay time calculation unit 313 in this embodiment. Another difference between the control apparatus 33 according to this embodiment and the control apparatus 30 according to the first embodiment is that the control unit 305 in the first embodiment is replaced by a control unit 314 in this embodiment.

The delay time calculation unit 313 calculates a time taken from when distance information is obtained by the distance information obtaining unit 200 until the distance information is input to the delay time calculation unit 313.

To be more specific, the delay time calculation unit 313 performs a process similar to the process for calculating a delay time that is performed by the distance information correction unit 303. That is, the delay time calculation unit 313 calculates a delay time as follows.

The delay time calculation unit 313 obtains, from the clock unit 304, a time indicating a time when decoded distance information is input from the decoding unit 302. That is, the delay time calculation unit 313 obtains an input time indicating a time when the distance information is input to the delay time calculation unit 313 from the clock unit 304. Further, when the distance information is input to the delay time calculation unit 313, the delay time calculation unit 313 reads out an obtained time for the distance information from the memory 301. Then, the delay time calculation unit 313 calculates a delay time by the above expression (1). When the delay time calculation unit 313 calculates the delay time, the delay time calculation unit 313 outputs the calculated delay time and the input distance information to the control unit 314.

A difference between the control unit 314 of this embodiment and the control unit 305 of the first embodiment is that the control unit 314 performs control using uncorrected distance information received by the reception unit 300. That is, the control unit 314 performs control using the uncorrected distance information and the delay time that have been output from the delay time calculation unit 313.

The control unit 314 may perform arbitrary control using the uncorrected distance information and the delay time. For example, a following time is calculated to perform control.

For example, when the control unit 314 controls the vehicle 1 using distance information indicating a distance to an object and a time until the vehicle 1 collides with the object (the time will be hereinafter referred to as a remaining time), corrected distance information is not necessarily needed to calculate the remaining time.

That is, although the remaining time, an error of which that is caused by a delay time has been corrected, is calculated by the following expression (3), an error in the distance information does not necessarily need to be removed to calculate the remaining time.

(Corrected remaining time)=(corrected distance)/ relative speed    (3)

This is because the following conversion of the expression is possible. The above expression (3) is converted into the following expression (4) by the above expression (2).

(Corrected remaining time)=((distance before correction)−(relative speed)×(delay time))/relative speed    (4)

Further, the expression (4) is summarized as the expression (5).

(Corrected remaining time)=(distance before correction)/(relative speed)−(delay time)    (5)

As described above, when the control system controls the vehicle 1 using a corrected remaining time, an error of which that is caused by a delay time has been removed, the control unit 314 does not necessarily need the corrected distance and can control the vehicle 1 using a distance before correction and a delay time.

Figure 8:
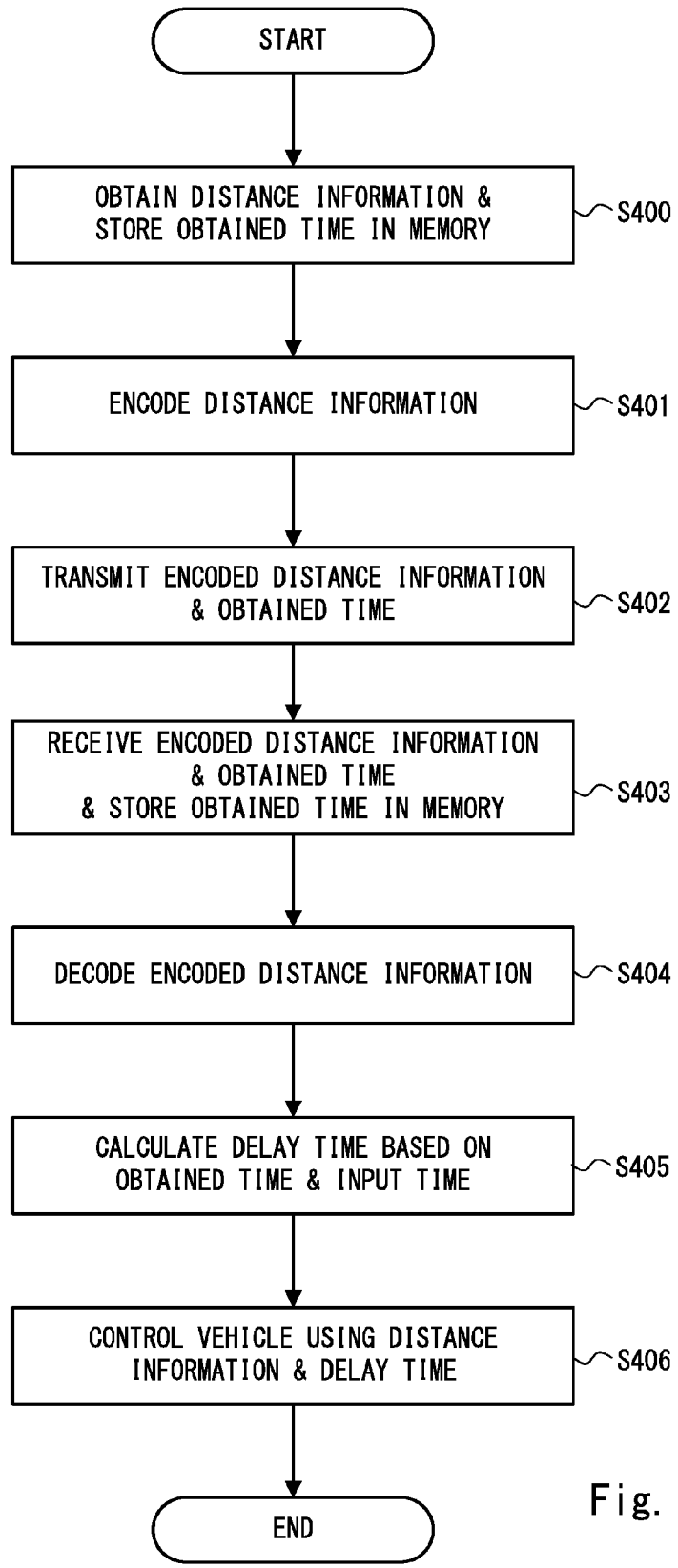
FIG. 8 is a flowchart showing an example of an operation of the control system according to the fourth embodiment.

Next, an example of an operation of the control system 13 according to the fourth embodiment will be described. FIG. 8 is a flowchart showing an example of an operation of the control system 13 according to the fourth embodiment. Hereinafter, the example of the operation will be described with reference to FIG. 8.

As the processes from the steps 400 (S400) to 404 (S404) are the same as the steps 100 (S100) to 104 (S104) performed by the control system 10 according to the first embodiment, descriptions thereof will be omitted.

After the step 404, in the step 405 (S405), the delay time calculation unit 313 calculates a delay time based on an obtained time and an input time. That is, the delay time calculation unit 313 calculates a delay time by the above expression (1).

In the step 406 (S406), the control unit 314 controls a vehicle using the distance information and the delay time. The distance information used by the control unit 314 for the control is not corrected.

According to this embodiment, the control system 13 can correct errors caused not only by a transmission delay in the network 40 but also by an arbitrary delay time generated from when distance information of an object is obtained until immediately before the distance information is used. In particular, according to the control system 13 of this embodiment, even when the control is performed using distance information that has not been corrected, it is possible to improve an accuracy of control that uses the distance information indicating a distance to an object.

Note that as in this embodiment, the delay time calculation unit 313 may be provided in other embodiments, and the control system may be configured to perform control based on a delay time and uncorrected distance information.

Fifth Embodiment

Figure 9:
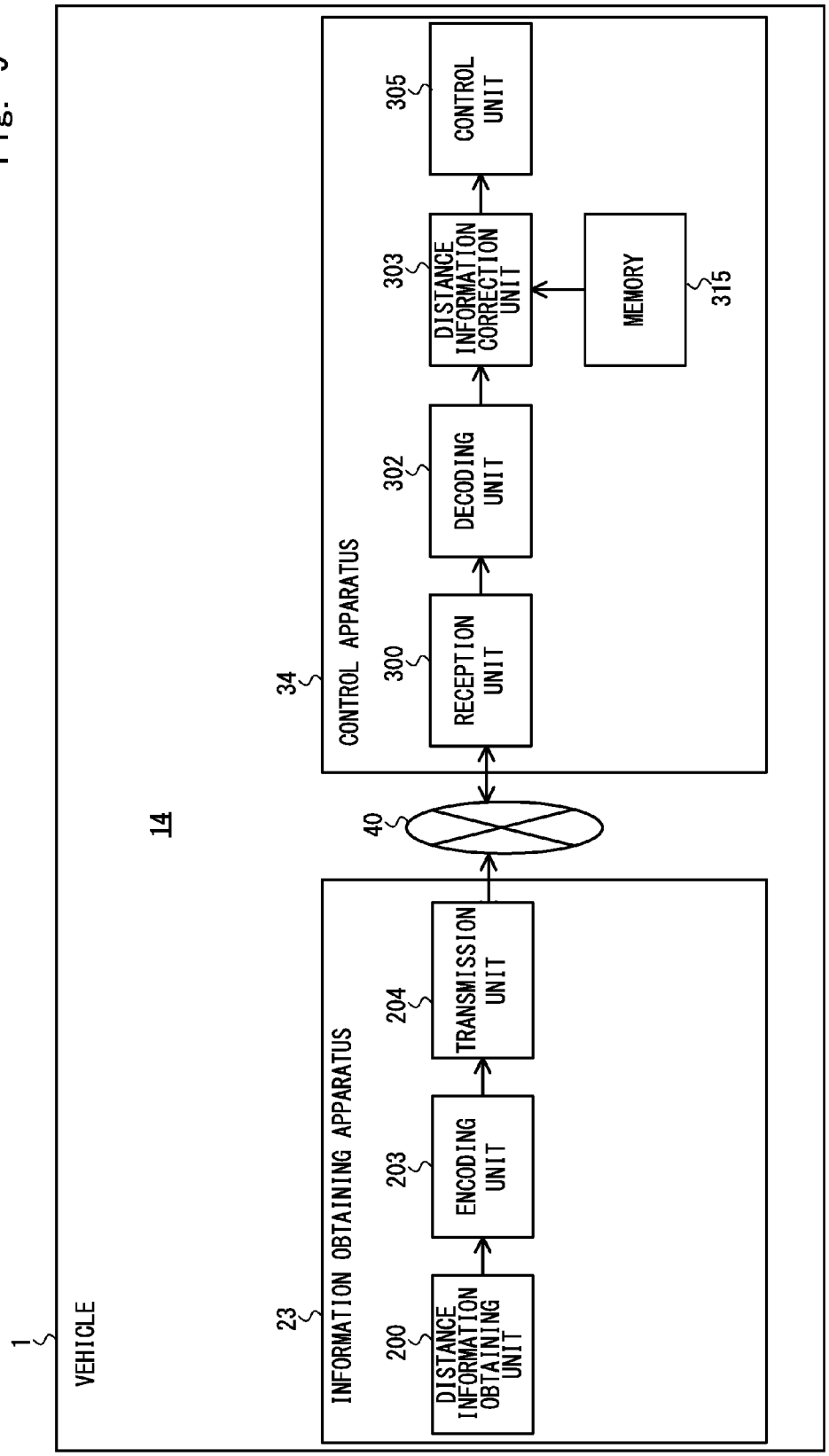
FIG. 9 is a block diagram showing a configuration of a control system according to a fifth embodiment.

Next, a control system 14 according to a fifth embodiment will be described. FIG. 9 is a block diagram showing a configuration of the control system 14 according to the fifth embodiment. In the above embodiments, a delay time is calculated based on times obtained from the clock units 201 and 304, respectively. On the other hand, in the control system 14 according to this embodiment, a delay time that has been previously measured or calculated is stored in a storage unit, and distance information is corrected based on the stored delay time.

In the control system 14, an information obtaining apparatus 23 and a control apparatus 34 are connected via the network 40.

A difference between the information obtaining apparatus 23 of this embodiment and the information obtaining apparatus 20 of the first embodiment is that the information obtaining apparatus 23 does not include the clock unit 201 and the memory 202. That is, the information obtaining apparatus 23 includes the distance information obtaining unit 200, the encoding unit 203, and the transmission unit 204. Unlike the distance information obtaining unit 200 of the first embodiment, the distance information obtaining unit 200 of this embodiment does not obtain an obtained time indicating a time when the distance information is obtained. Further, unlike the transmission unit 204 of the first embodiment, the transmission unit 204 of this embodiment does not transmit an obtained time.

A difference between the control apparatus 34 of this embodiment and the control apparatus 30 of the first embodiment is that the control apparatus 34 does not include the clock unit 304 and includes a memory 315 in place of the memory 301 of the control apparatus 30. That is, the control apparatus 34 includes the reception unit 300, the decoding unit 302, the memory 315, the distance information correction unit 303, and the control unit 305. Unlike the reception unit 300 of the first embodiment, the reception unit 300 of this embodiment does not receive an obtained time. Further, unlike the distance information correction unit 303 of the first embodiment, the distance information correction unit 303 of this embodiment does not use an obtained time and an input time but uses a delay time stored in the memory 315 instead to correct the distance information. As with the memory 202, the memory 315 is a storage unit that is comprised of, for example, an SRAM, a DDR memory, or the like. The memory 315 previously stores a time taken from when distance information is obtained by the distance information obtaining unit 200 until the distance information is input to the distance information correction unit 303. When the distance information is input to the distance information correction unit 303, the distance information correction unit 303 reads out the delay time previously stored in the memory 315 and corrects the distance information by the above expression (2).

Figure 10:
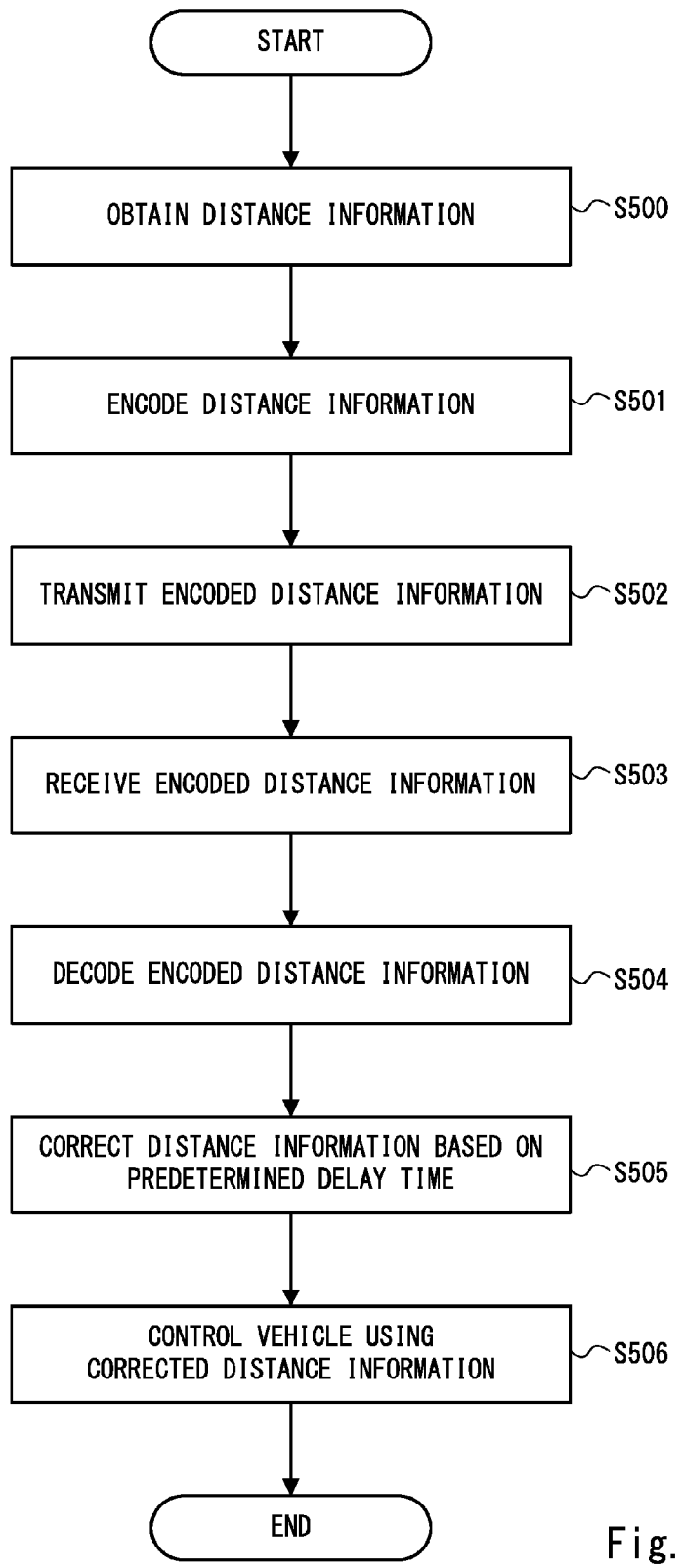
FIG. 10 is a flowchart showing an example of an operation of the control system according to the fifth embodiment.

Next, an example of an operation of the control system 14 according to the fifth embodiment will be described. FIG. 10 is a flowchart showing an example of an operation of the control system 14 according to the fifth embodiment. Hereinafter, the example of the operation will be described with reference to FIG. 10.

In the step 500 (S500), the distance information obtaining unit 200 obtains distance information and outputs the obtained distance information to the encoding unit 203.

In the step 501 (S501), the encoding unit 203 encodes the input distance information according to a predetermined encoding scheme and outputs the encoded distance information to the transmission unit 204.

In the step 502 (S502), the transmission unit 204 transmits the distance information encoded in the step 501 to the control apparatus 34 via the network 40.

In the step 503 (S503), the reception unit 300 of the control apparatus 34 receives the encoded distance information and outputs the received distance information to the decoding unit 302.

In the step 504 (S504), the decoding unit 302 decodes the encoded distance information. The decoding unit 302 outputs the decoded distance information to the distance information correction unit 303.

In the step 505 (S505), the distance information correction unit 303 corrects the distance information based on a predetermined delay time. To be more specific, the distance information correction unit 303 reads out the delay time from the memory 315 and calculates the corrected distance information by the expression (2).

In the step 506 (S506), the control unit 305 controls the vehicle 1 based on the distance information corrected in the step 505.

According to this embodiment, the control system 14 can correct errors caused not only by a transmission delay in the network 40 but also by an arbitrary delay time generated from when distance information of an object is obtained until immediately before the distance information is used. In particular, according to the control system 14 of this embodiment, even with a configuration in which a clock unit is not included, it is possible to improve an accuracy of control that uses the distance information indicating a distance to an object.

Note that as in this embodiment, the memory 315 in which a delay time is previously stored may be provided in other embodiments, and calculation of a delay time may be omitted.

Sixth Embodiment

Figure 11:
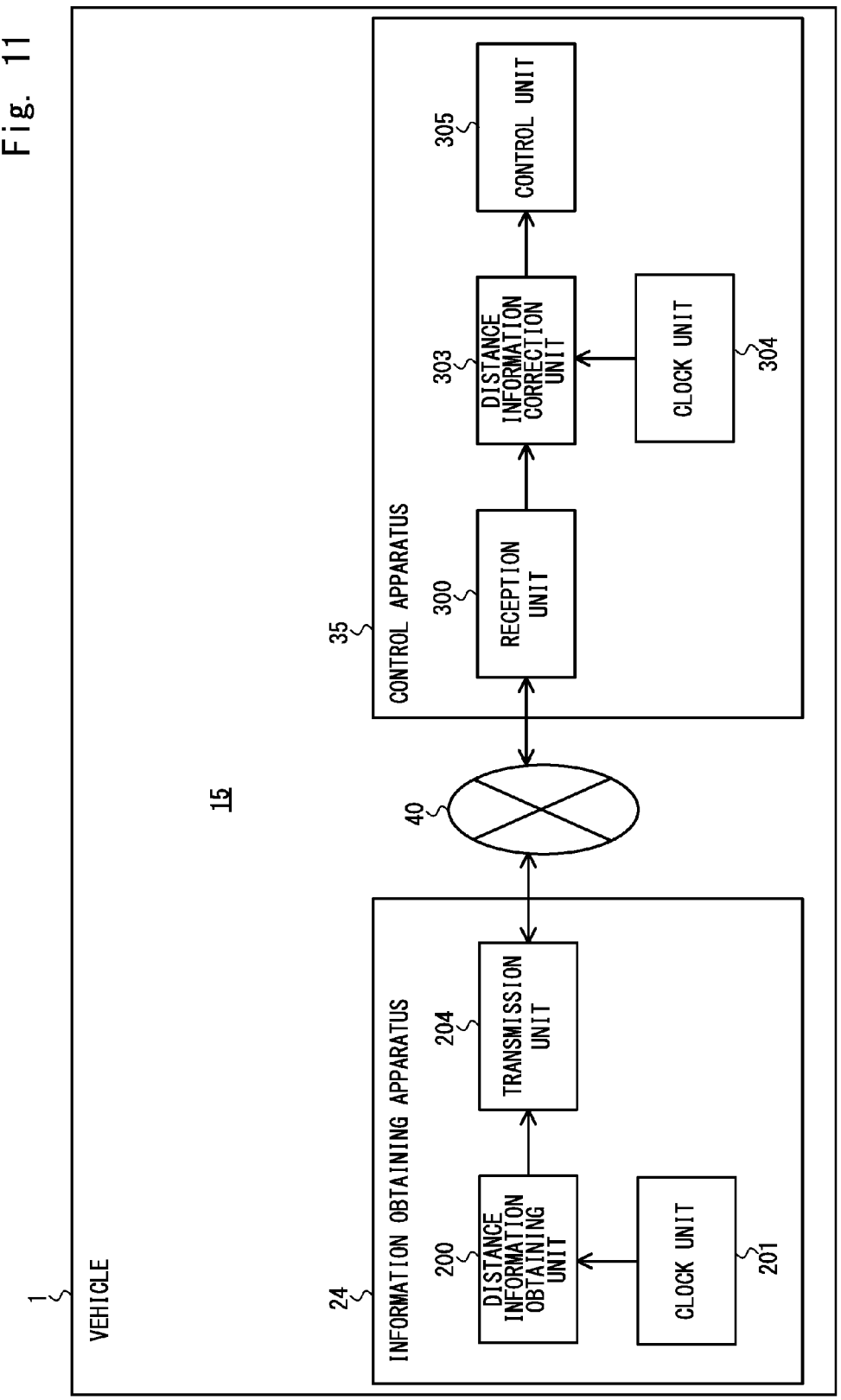
FIG. 11 is a block diagram showing a configuration of a control system according to a sixth embodiment.

Next, a control system 15 according to a sixth embodiment will be described. FIG. 11 is a block diagram showing a configuration of the control system 15 according to the sixth embodiment. In the above embodiments, although the control system includes processing units such as an encoding unit, a decoding unit, and a distance information generation unit, the control system does not necessarily has to include the processing units as shown in FIG. 11.

In the control system 15 shown in FIG. 11, an information obtaining apparatus 24 and a control apparatus 35 are connected via the network 40.

A difference between the information obtaining apparatus 24 of this embodiment and the information obtaining apparatus 20 of the first embodiment is that the information obtaining apparatus 24 does not include the memory 202 and the encoding unit 203. That is, the information obtaining apparatus 24 includes the distance information obtaining unit 200, the clock unit 201, and the transmission unit 204. A difference between the control apparatus 35 of this embodiment and the control apparatus 30 of the first embodiment is that the control apparatus 35 does not include the memory 301 and the decoding unit 302. That is, the control apparatus 35 includes the reception unit 300, the distance information correction unit 303, the clock unit 304, and the control unit 305.

Figure 12:
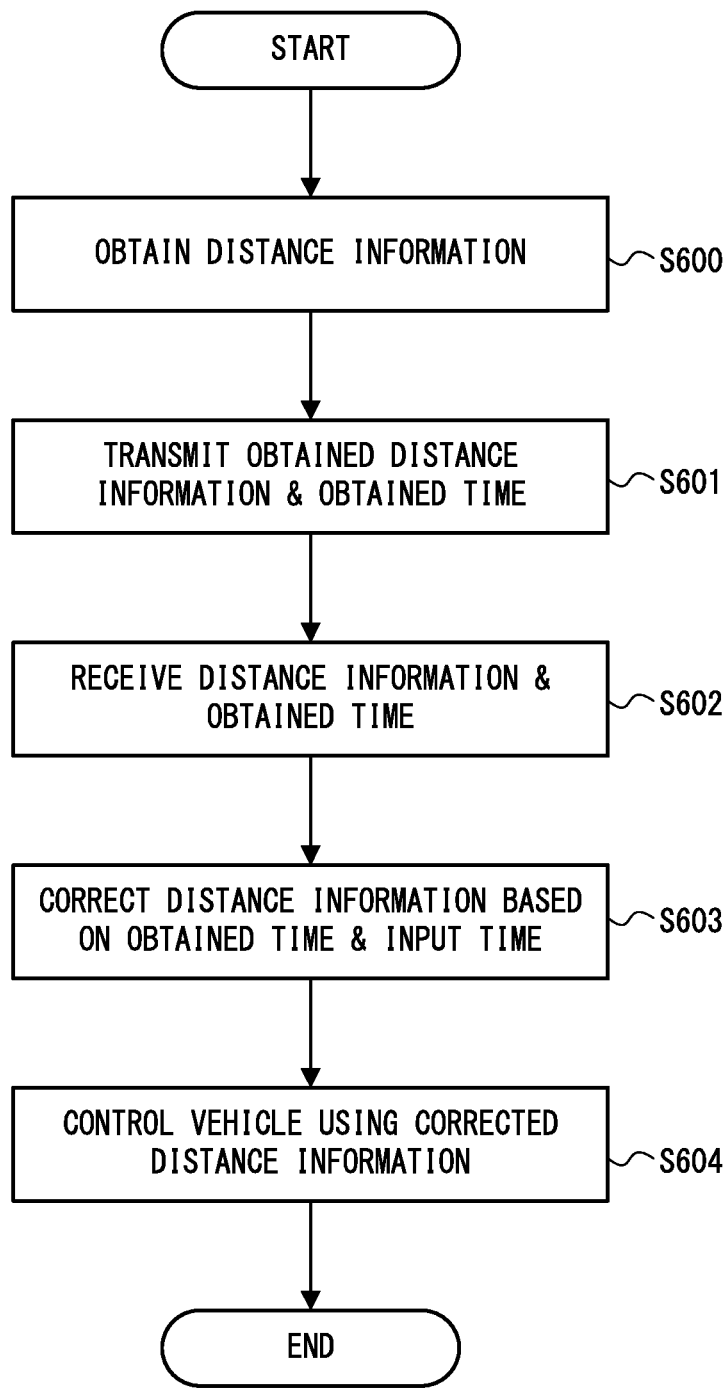
FIG. 12 is a flowchart showing an example of an operation of the control system according to the sixth embodiment.

As the components of the information obtaining apparatus 24 and the control apparatus 35 are the same as those of the first embodiment, descriptions thereof will be omitted. An example of an operation of the control system 15 according to the sixth embodiment will be described. FIG. 12 is a flowchart showing an example of an operation of the control system 15 according to the sixth embodiment. Hereinafter, the example of the operation will be described with reference to FIG. 12.

In the step 600 (S600), the distance information obtaining unit 200 obtains distance information. At this time, the distance information obtaining unit 200 obtains an obtained time for the distance information from the clock unit 201.

In the step 601 (S601), the transmission unit 204 transmits the distance information and the obtained time for the distance information to the control apparatus 35 via the network 40.

In the step 602 (S602), the reception unit 300 of the control apparatus 30 receives the distance information and the obtained time.

In the step 603 (S603), the distance information correction unit 303 corrects the distance information based on the obtained time for the distance information and an input time indicating a time when the distance information is input to the distance information correction unit 303. To be more specific, when the distance information is input to the distance information correction unit 303 from the reception unit 300, the distance information correction unit 303 obtains the input time from the clock unit 304, calculates a delay time by the expression (1) using the input time and the obtained time received in the step 602, and calculates corrected distance information by the expression (2).

In the step 604 (S604), the control unit 305 controls the vehicle 1 based on the distance information corrected in the step 603.

According to this embodiment, the control system 15 calculates a delay time based on an obtained time for distance information and an input time indicating a time when the distance information is input to the distance information correction unit 303. Accordingly, it is possible to correct not only a transmission delay generated in transmissions in the transmission unit 204, the network 40, and the reception unit 300 but also any delay generated from when distance information is obtained until the distance information is transmitted by the transmission unit 204 and any delay generated from when the reception unit 300 receives the distance information until the distance information is input to the distance information correction unit 303. Therefore, according to the control system 15 of this embodiment, it is possible to improve an accuracy of control that uses the distance information indicating a distance to an object.

Note that in this embodiment, a calculated delay time may only be a transmission delay. Further, in other embodiments, as in this embodiment, the encoding unit 203 and the decoding unit 302 may not be included.

Although the invention carried out by the inventor has been described based on the embodiments, it is obvious that the present invention is not limited to the above embodiments, and various modifications can be made to the invention without departing from the scope thereof. For example, as shown in FIG. 13, the information obtaining apparatus or the control apparatus may not include the clock unit and obtain an obtained time or an input time from a clock unit (not shown) that is provided outside. Moreover, the information obtaining apparatus and the control apparatus may be mounted on any apparatus other than a vehicle, and an object to be controlled is not limited to a vehicle.

The first to sixth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A control system comprising:
   an information obtaining apparatus;
   a network; and
   a control apparatus,
   wherein
   the information obtaining apparatus comprises:
      a distance information obtaining device configured to obtain distance information indicating a distance to an object; and
      a transmitter configured to transmit the distance information obtained by the distance information obtaining device,
   the control apparatus comprises:
      a receiver configured to receive the distance information transmitted by the transmitter via the network;
      a distance information correcting circuit configured to correct the distance information received by the receiver; and
      a controller configured to perform control using the distance information corrected by the distance information correcting circuit, and
      wherein the distance information correcting circuit corrects a first distance information based on a time between a time when the first distance information is obtained by the distance information obtaining device and a time when the first distance information is input to the distance information correcting circuit from the distance information obtaining device via the network.

2. The control system according to claim 1, wherein
   the information obtaining apparatus or the control apparatus comprises a processor configured to perform a predetermined process on the distance information obtained by the distance information obtaining device, and
   the distance information correcting circuit corrects the distance information, on which the process has been performed by the processor based on an obtained time indicating a time when the distance information is obtained by the distance information obtaining device and an input time indicating a time when the distance information, on which the process has been performed by the processor, is input to the distance information correcting circuit.

3. The control system according to claim 2, wherein the processor performs an encoding process on the distance information obtained by the distance information obtaining device.

4. The control system according to claim 1, wherein
   the control system comprises a plurality of information obtaining apparatuses,
   the control apparatus further comprises a storage unit,
   the storage unit stores the distance information obtained by the distance information obtaining device and an obtained time indicating a time when the distance information is obtained, and
   the distance information correcting circuit corrects the distance information based on the obtained time stored in the storage unit and an input time indicating a time when the distance information is input to the distance information correcting circuit from the storage unit.

5. The control system according to claim 1, wherein
   the transmitter transmits the distance information and an obtained time indicating a time when the distance information is obtained by the distance information obtaining device,
   the receiver receives the distance information and the obtained time, and
   the distance information correcting circuit corrects the distance information based on the obtained time received by the receiver and an input time indicating a time when the distance information is input to the distance information correcting circuit.

6. The control system according to claim 1, wherein
   the control apparatus comprises a storage unit that previously stores a time taken from when the distance information is obtained by the distance information obtaining device until the distance information is input to the distance information correcting circuit, and
   the distance information correcting circuit uses the time stored in the storage unit to correct the distance information.

7. The control system according to claim 1, wherein the distance information correcting circuit uses a relative speed with respect to the object to correct the distance information.

8. The control system according to claim 7, wherein when the object is a stationary object, the distance information correcting circuit uses a speed of the control system as the relative speed.

9. The control system according to claim 7, wherein when the object is a moving object, the distance information correcting circuit uses a speed calculated from a change in the distance information obtained by the distance information obtaining device as the relative speed.

10. The control system according to claim 1, wherein the network is a network compliant with Ethernet.

11. The control system according to claim 1, wherein the controller controls a vehicle using the distance information.

12. A control system comprising:
a camera;
a network; and
a control apparatus,
wherein
the camera comprises:
an imager configured to capture an image of an object; and
a transmitter configured to transmit the image captured by the imager,
the control apparatus comprises:
a receiver configured to receive the image transmitted by the transmitter via the network;
a distance information generating device configured to generate distance information indicating a distance to the object from the image received by the receiver;
a distance information correcting circuit configured to correct the distance information generated by the distance information generating device; and
a controller configured to perform control using the distance information corrected by the distance information correcting circuit, and
wherein the distance information correcting circuit corrects the distance information based on a time between a time when the image is captured by the imager and a time when the distance information is input to the distance information correcting circuit from the imager via the network.

13. A control system comprising:
an information obtaining apparatus;
a network; and
a control apparatus,
wherein
the information obtaining apparatus comprises:
a distance information obtaining device configured to obtain distance information indicating a distance to an object; and
a transmitter configured to transmit the distance information obtained by the distance information obtaining device,
the control apparatus comprises:
a receiver configured to receive the distance information transmitted by the transmitter via the network;
a delay time calculator; and
a controller,
wherein the delay time calculator calculates a time between a time when the distance information is obtained by the distance information obtaining device and a time when the distance information is input to the delay time calculator from the distance information obtaining device via the network, and
wherein the controller performs control using the distance information received by the receiver and the time calculated by the delay time calculator.

* * * * *